United States Patent
Lapadula et al.

(10) Patent No.: US 8,647,549 B2
(45) Date of Patent: Feb. 11, 2014

(54) METHOD AND MOULD FOR THERMOFORMING AND FOLDING A PLASTIC SHEET

(75) Inventors: Donato Lapadula, Rionero in Vulture (IT); Claudio Pagano, Salerno (IT); Alfonso Sorrentino, Capaccio Scalo (IT)

(73) Assignee: Johnson Controls Automotive S.r.l., Grugliasco, Turin (IT)

( * ) Notice: Subject to any disclaimer, the term of this patent is extended or adjusted under 35 U.S.C. 154(b) by 18 days.

(21) Appl. No.: 13/130,029

(22) PCT Filed: Nov. 17, 2009

(86) PCT No.: PCT/IB2009/055116
§ 371 (c)(1), (2), (4) Date: May 18, 2011

(87) PCT Pub. No.: WO2010/058340
PCT Pub. Date: May 27, 2010

(65) Prior Publication Data
US 2011/0221091 A1 Sep. 15, 2011

(30) Foreign Application Priority Data
Nov. 19, 2008 (IT) ............................... TO2008A0853

(51) Int. Cl.
*B28B 7/14* (2006.01)
(52) U.S. Cl.
USPC ........... 264/163; 264/237; 264/294; 264/295; 264/322; 264/339

(58) Field of Classification Search
USPC .................. 264/163, 237, 294, 295, 322, 339
See application file for complete search history.

(56) References Cited

FOREIGN PATENT DOCUMENTS

| DE | 22 14 361 A1 | 10/1973 |
| DE | 44 24 409 A1 | 1/1996 |
| EP | 0 380 250 A2 | 8/1990 |
| FR | 2 424 805 A1 | 11/1979 |
| JP | 57-133019 A | 8/1982 |
| JP | 63199628 | * 8/1988 |
| JP | 63-199628 A | 8/1998 |

* cited by examiner

*Primary Examiner* — Monica Huson
*Assistant Examiner* — Saeed Huda
(74) *Attorney, Agent, or Firm* — Merchant & Gould P.C.

(57) ABSTRACT

A method for producing a thermo formed part includes closing in a mold a heated sheet (L) made of thermoplastic material in such a manner as to deform the latter, then cooling it inside the mold until complete consolidation is achieved. During cooling, the sheet is cut along at least one edge portion (E) thereof, this cutting operation causing a bending of the edge portion against an abutment surface (1s) in the mold; and removing the upper half-mold from the lower half-mold once the consolidation of the deformed sheet has been attained. During the cooling of the sheet inside the mold, subsequently to the cutting operation a folding operation is performed, this folding operation includes moving the abutment surface away from the edge portion of the sheet, and operating on the edge portion in such a manner as to resume its bending towards a support surface (2s) of the sheet in the mold.

3 Claims, 2 Drawing Sheets

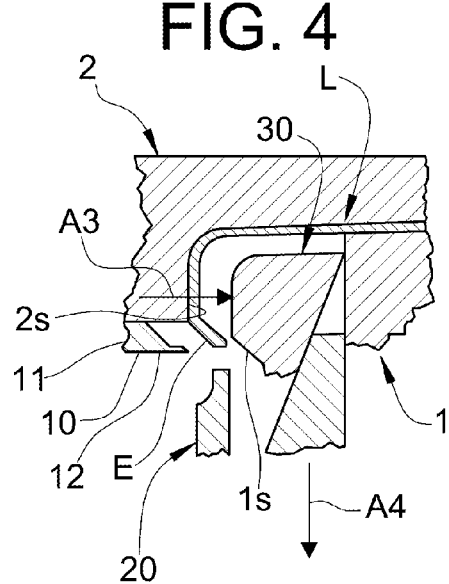
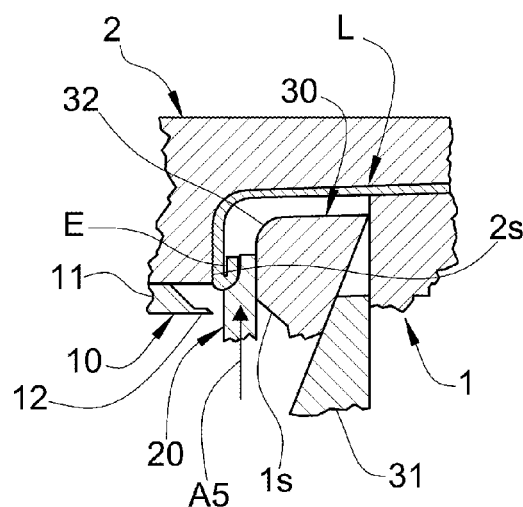
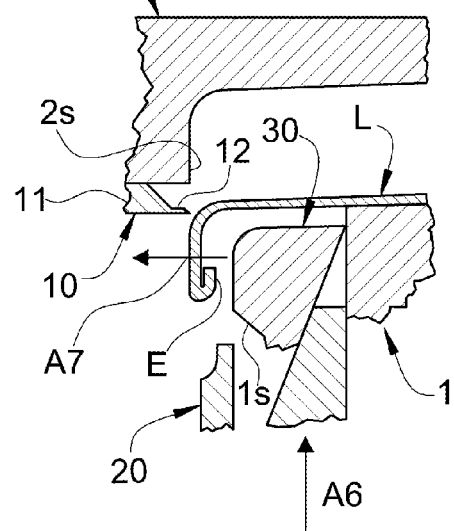

METHOD AND MOULD FOR THERMOFORMING AND FOLDING A PLASTIC SHEET

This application is a National Stage Application of PCT/IB2009/055116, filed 17 Nov. 2009, which claims benefit of Serial No. TO2008A000853, filed 19 Nov. 2008 in Italy and which applications are incorporated herein by reference. To the extent appropriate, a claim of priority is made to each of the above disclosed applications.

BACKGROUND OF THE INVENTION

The present invention relates to a method for producing a thermoformed part, comprising the steps of:
providing a mould comprising a lower half-mould and an upper half-mould;
providing a heated sheet made of thermoplastic material on said lower half-mould;
coupling said upper half-mould to said lower half-mould in such a manner as to deform said sheet, then cooling it inside the mould until complete consolidation is achieved;
during said cooling, cutting the sheet along at least one edge portion thereof, said cutting operation causing a bending of the edge portion of the sheet against an abutment surface provided on one of said lower and upper half-moulds; and
removing said upper half-mould from the lower half-mould once the consolidation of the deformed sheet has been attained.

A method of this kind is used, for example, in the production of trim panels for motor vehicle doors. In this field, a sheet of thermoplastic material, combined with a covering if necessary, is heated until the material softens, and is then placed in a thermoforming mould. Thus the mould shapes the sheet, which is cooled and consolidated in contact with the cold walls of the mould. When consolidation is complete, the mould is opened to enable the thermoformed part to be removed.

During cooling in the mould, the sheet can be subjected to a cutting (shearing) operation along at least one of its edge portions, for the purpose of trimming. This cutting operation is normally carried out in such a way that the edge portion of the sheet is bent through a certain angle, less than 90°, until it abuts on an abutment surface provided on the mould.

Depending on requirements, the edge portion may need to be folded, in other words bent back on itself through an angle of more than 90°, the theoretical maximum angle being 180°. This folding operation is conventionally carried out with the mould open, after the forming of the sheet. For this purpose, the edge portion which has been bent during the cutting step in the mould is reheated, so that the bending of this edge portion can be resumed until the desired fold is attained. On a production line, a special station, separate from the thermoforming station, is required for the folding operation.

In view of this, the present invention proposes to provide a method and a mould for producing a thermoformed sheet which can simplify the production process by eliminating the need for a dedicated folding station.

SUMMARY OF THE INVENTION

Accordingly, the object of the invention is a method of the type defined initially, in which, during the cooling of the sheet in the mould and after the cutting operation, a folding operation is carried out, said folding operation comprising the steps of:
moving said abutment surface away from the edge portion of the sheet; and
operating mechanically on the edge portion in such a manner as to resume its bending towards a support surface for supporting the sheet provided on the other of said lower and upper half-moulds.

In the method according to the invention, the fact that the abutment surface is moved away from the edge portion of the sheet means that this edge portion can be accessed from the correct side to enable its bending to be resumed to a desired point. This bending is made possible by the provision of a support surface inside the mould to hold the sheet firm in opposition to the stresses to which it is subjected during the folding of the edge portion.

Another object of the invention is a mould for producing a thermoformed part, said mould comprising a first and a second half-mould adapted to be coupled to each other to deform a heated sheet made of thermoplastic material, wherein said first half-mould is provided with controllable cutting means for cutting, with the mould closed, the sheet along at least one edge portion of the latter, said cutting means being further configured to cause a bending of the edge portion of the sheet against an abutment surface provided on the second half-mould;
in which the mould additionally comprises:
folding means installed on said second half-mould, such folding means being controllable to operate mechanically, with the mould closed, on the edge portion of the sheet in such a manner as to resume its bending towards a support surface of the sheet provided on the first half-mould, and
a moveable portion of the second half-mould adapted to support said abutment surface, said moveable portion being controllable in such a manner as to be able to assume a cutting position, wherein it provides the abutment surface for the edge portion of the sheet, and a folding position, wherein it moves away from the edge portion of the sheet to allow the resumption of the bending of the edge portion of the sheet towards the support surface of the sheet provided on the first half-mould.

Since the folding is carried out inside the mould, and therefore in the course of the thermoforming step, it is no longer necessary to provide a special station for this folding on a production line.

BRIEF DESCRIPTION OF THE DRAWINGS

These and other objects and advantages will be made clearer by the following detailed description of some examples of embodiment of the invention, provided with reference to the attached drawings, in which:
FIG. 4 shows schematically a step of releasing the edge portion from an abutment surface of the mould;
FIG. 5 shows schematically a step of folding the edge portion of the sheet;
and
FIG. 6 shows schematically a step of opening the mould.

DETAILED DESCRIPTION OF THE PREFERRED EMBODIMENTS

Figure 1:
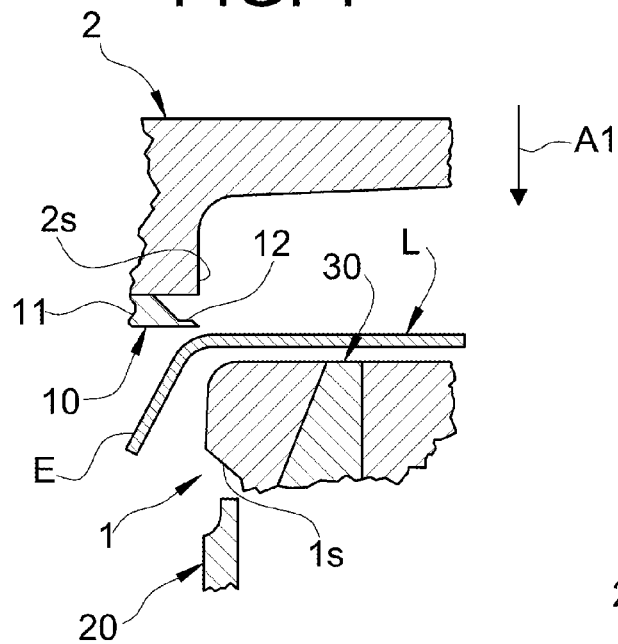
FIG. 1 shows schematically a step of closing the mould in a method for producing a thermoformed part according to the invention.

With reference to the drawings, a method for producing a thermoformed part will now be described. The drawings show in cross section a detail of a mould adapted to apply a method of this kind. This mould comprises a lower half-mould, indicated as a whole by 1, and an upper half-mould, indicated as a whole by 2. The half-moulds 1 and 2 can be coupled to each other to deform a sheet L of thermoplastic material which has been previously heated and therefore softened. This sheet L can be combined with a covering, for finishing purposes for example.

In the illustrated example, the upper half-mould 2 is provided with cutting means 10, described more fully below, while the lower half-mould 1 is provided with folding means 20 and with a moveable portion 30, which are also described more fully below. However, this arrangement is not essential, since the cutting means can, for example, be installed on the lower half-mould, and the folding means and the moveable portion can be installed on the upper half-mould.

With reference to FIG. 1, the sheet L which has been heated, and therefore softened, is initially positioned on the lower half-mould 1, with a covering superimposed if required to improve the appearance. The upper half-mould 2 is then coupled to the lower half-mould 1, so that the mould is closed. In FIG. 1, A1 indicates the direction of closing of the upper half-mould 2, defining the moulding axis.

Figure 2:
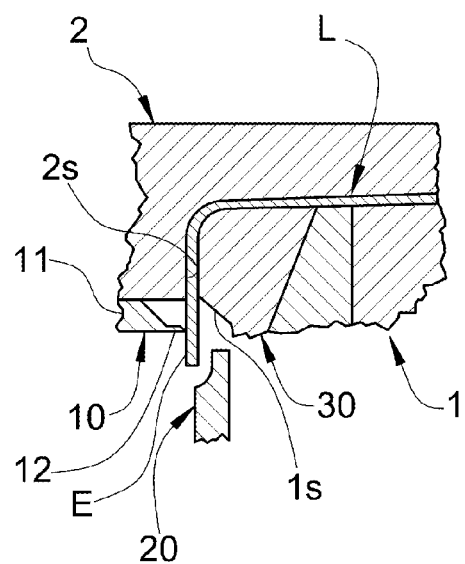
FIG. 2 shows schematically a step of forming the sheet.

With reference to FIG. 2, the closing of the mould causes the deformation of the sheet L to the desired shape. The mould is kept closed to enable the sheet L to partially cool, in order to retain the shape (to complete the forming).

Figure 3:
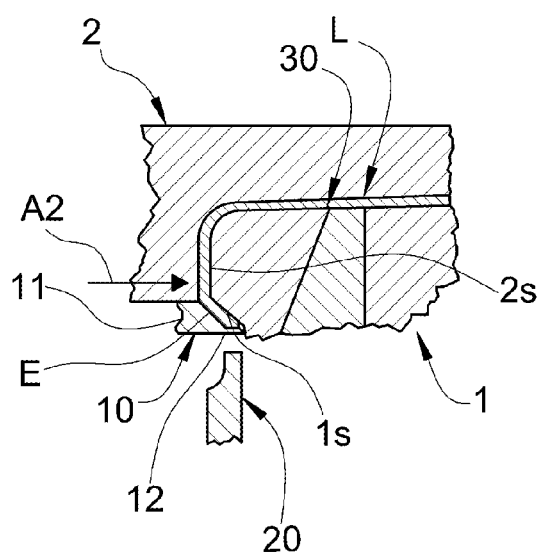
FIG. 3 shows schematically a step of making a perimetric cut in an edge portion of the sheet.

With reference to FIG. 3, while the sheet is cooling it is cut (sheared) along at least one edge portion E, by the cutting means 10. In the illustrated example, these cutting means 10 comprise a moveable slider 11 installed on the upper half-mould 2 and provided with a cutting blade 12, which is advanced against the edge portion E of the sheet L (arrow A2). In the illustrated example, the lower half-mould 1 is shaped in such a way as to provide an abutment surface 1s. The slider 11 and the cutting blade 12 are also configured in such a way that the cutting operation also causes the bending of the edge portion E of the sheet L against the abutment surface 1s provided on the lower half-mould 1. The edge portion E is thus bent through a certain angle, which is less than 90°, with respect to the sheet portion adjacent to it, and bears against the abutment surface 1s. The edge portion E of the sheet L thus forms an undercut with respect to the moulding axis. When the cutting and bending are complete, the slider 11 is withdrawn to the position shown in FIG. 1.

With reference to FIGS. 4 and 5, according to the invention a folding operation is carried out during the cooling of the sheet L inside the mould and after the cutting operation. The folding operation includes a step of moving the abutment surface is away from the edge portion E of the sheet L, shown in FIG. 4, and a step of carrying out the actual fold, shown in FIG. 5.

With reference to FIG. 4, the step of moving the abutment surface 1s away from the edge portion E of the sheet L is carried out by means of the moveable portion 30 of the lower half-mould 1, which supports the abutment surface 1s. In this step the moveable portion 30 reaches a folding position, in which the abutment surface 1s is moved to a sufficient distance from the edge portion E of the sheet L to permit the execution of the next step of folding the sheet. This moveable portion can, for example, be made in the form of a moveable carriage 32, for example by adopting the movement system shown in FIG. 4, which includes a support member in the form of a vertically moveable inclined plane 31, on which the moveable carriage 32 runs. The lowering of the support member 31 in the direction of the arrow A4 causes the moveable carriage 32 to move away in the direction of the arrow A3. This movement is sufficiently extensive to release the part of the moveable portion 30 of the lower half-mould 1 from the undercut formed by the edge portion E of the sheet L.

When the configuration shown in FIG. 4 is reached, a mechanical operation is carried out on the edge portion E in such a way as to resume its bending towards a support surface 2s of the sheet L, provided on the upper half-mould 2. This operation is executed by the folding means 20. In the illustrated example, these folding means 20 comprise a vertically moveable slider which advances towards the edge portion E of the sheet L in the direction of the arrow A5. This slider has a head which is shaped in such a way as to cause the desired folding. The final bend is greater than 90°, and can theoretically be as much as 180°. The slider is then withdrawn to the original position shown in FIG. 4.

With reference to FIG. 6, the mould is opened when the cooling step is complete, and the finished part can be extracted. Following the extraction of the part, the moveable portion 30, which has been withdrawn as shown in FIG. 4, is returned to the original position shown in FIGS. 1 to 3 (such that the moveable portion 30 again provides the abutment surface required for the bending and cutting of the edge portion E of the sheet L), as indicated by the arrows A6 and A7.

Evidently, the fact that the abutment surface 1s is moved away from the edge portion E of the sheet L means that this edge portion can be accessed from the correct side to enable its bending to be resumed to a desired point, by the application of the folding means 20. This bending is made possible by the provision of the support surface 2s inside the mould to hold the sheet L firm in opposition to the stresses to which it is subjected during the folding of the edge portion E. Since the folding is carried out inside the mould, and therefore in the course of the thermoforming step, it is no longer necessary to provide a special station for this folding on a production line.

It is to be understood that the embodiments described herein are to be considered as examples of embodiment of the invention; the invention can be modified in respect of its form and the positions of parts, and the details of construction and operation, according to the numerous possible variants which appear appropriate to those skilled in the art. More specifically, the angles of operation and the composition of the moving parts are dependent on the geometry of the part and the folding to be carried out.

The invention claimed is:

1. A process for producing a thermoformed part, comprising the steps of:
    providing a mould comprising a lower half-mould, an upper half-mould, and an abutment surface on one of said lower half-mould and said upper-half mould;
    providing a heated sheet made of thermoplastic material, on said lower half-mould;
    coupling said upper half-mould to said lower half-mould in such a manner to deform said sheet, then cooling said sheet inside the mould until complete consolidation is achieved;
    during said cooling, cutting the sheet along at least one edge portion thereof, said cutting operation causing a simultaneous bending of the edge portion of the sheet against said abutment surface; and removing said upper half-mould from the lower half-mould once the consolidation of the deformed sheet has been attained;

subsequent to the cutting operation and during the cooling of the sheet inside the mould, performing a folding operation inside the mould, said folding operation comprising the steps of:

moving said abutment surface away from the edge portion of the sheet; and mechanically bending the edge portion of the sheet to resume bending towards a support surface for supporting the sheet on one of said lower and upper half-moulds.

2. A process for producing a thermoformed part according to claim 1, wherein the bending bends the edge portion at an angle less than 90 degrees before resuming bending.

3. A process for producing a thermoformed part according to claim 1, wherein the folding operation creates a final bend greater than 90 degrees.

\* \* \* \* \*